United States Patent [19]

Nagao et al.

[11] 4,221,923
[45] Sep. 9, 1980

[54] TEMPERATURE CONTROLLER HAVING COLD JUNCTION COMPENSATION ELEMENT POSITIONED WITHIN A GUIDEPIN

[75] Inventors: Toshiaki Nagao; Yasuo Ohashi, both of Nagaokakyo, Japan

[73] Assignee: Omron Tateisi Electronics Co., Kyoto, Japan

[21] Appl. No.: 953,028

[22] Filed: Oct. 20, 1978

[30] Foreign Application Priority Data

Nov. 9, 1977 [JP] Japan ............................ 52-134943

[51] Int. Cl.² ............................................. G01K 7/12
[52] U.S. Cl. ...................................... 136/222; 73/361
[58] Field of Search .................... 73/361; 236/15 BR; 324/105; 136/232, 222

[56] References Cited

U.S. PATENT DOCUMENTS

| 1,344,462 | 6/1920 | Thwing | 73/361 X |
| 1,411,033 | 3/1922 | Jensen | 73/361 |
| 1,533,740 | 4/1925 | Keinath | 73/361 X |
| 2,581,812 | 1/1952 | Page | 136/230 X |
| 2,764,023 | 9/1956 | Vonnegut | 73/349 |
| 4,133,700 | 1/1979 | Hollander et al. | 73/361 |

OTHER PUBLICATIONS

Publication, Omron ® Type E5A, "Solid State Temperature Controller" (pp. 1–14), Cat. No. E5A–002, Jul. 1977.

*Primary Examiner*—Daniel M. Yasich
*Attorney, Agent, or Firm*—Stevens, Davis, Miller & Mosher

[57] ABSTRACT

A temperature controller utilizing a thermocouple having hot and cold junctions including a housing, a control circuit unit mounted in the interior of the housing, a cold junction compensation element, and a plug having a projecting hollow guide-pin and a plurality of projecting terminal-pins surrounding the guide-pin. The hollow guide-pin has an opening communicating with the exterior of the housing and the cold junction compensation element is positioned in the hollow guide pin.

5 Claims, 4 Drawing Figures

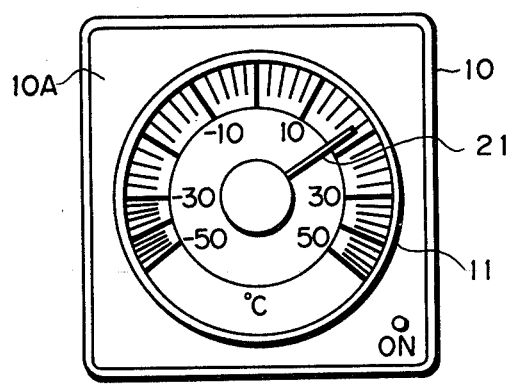
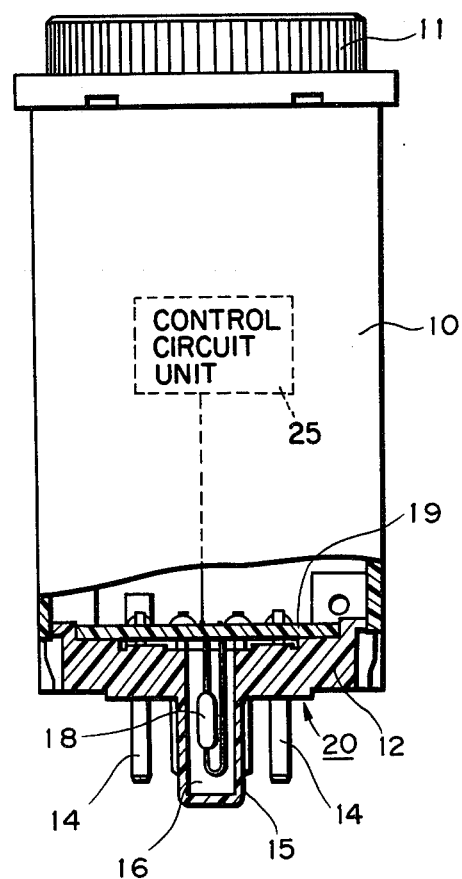
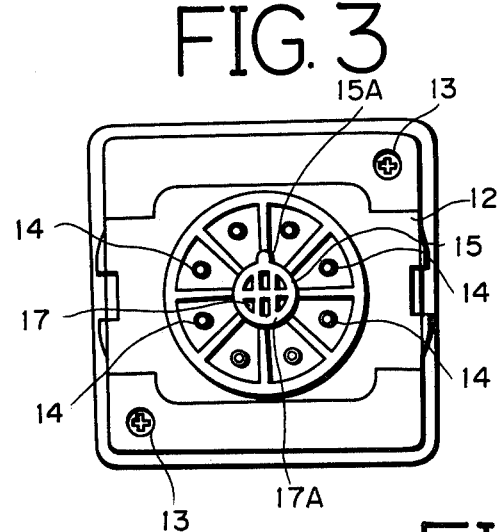
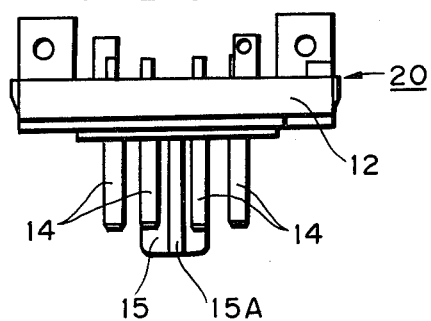

TEMPERATURE CONTROLLER HAVING COLD JUNCTION COMPENSATION ELEMENT POSITIONED WITHIN A GUIDEPIN

BACKGROUND OF THE INVENTION

This invention relates to a temperature controller utilizing a thermocouple having hot and cold junctions as a temperature detecting means.

A temperature controller utilizing a thermocouple detects and controls the temperature of a measuring object in accordance with the thermoelectric voltage which is generated by the thermocouple according to the temperature difference between a measuring junction positioned adjacent to the measuring object such as a furnace and a reference junction or junctions, known as cold junction or junctions, positioned near the housing of the temperature controller. It is well known that some temperature compensation for the cold junction is required for accurate measurement, since the ambient temperature around the cold junction often varies. A temperature controller heretofore used is provided with a cold junction temperature compensation element which is fixed to a terminal cover, which in turn is fixed to the housing of the temperature controller. This controller is described in Omron Tatusi Electronics Co., Catalog No. ESA-002, entitled "Omron Solid State Temperature Controller", July, 1977. However, the thus constructed temperature controller is not structurally copact, and is expensive to manufacture.

Therefore, it is an object of this invention to provide a temperature controller which is accurately operable in spite of fluctuations in ambient temperature. It is another object of this invention to provide a temperature controller which is compact and can be manufactured at low cost. The temperature controller of this invention is characterized in that a cold junction compensation element is located in a hollow projecting guide-pin of a plug having a plurality of projecting terminal-pins surrounding the hollow guide-pin, the internal space of the hollow guide-pin communicating with the ambient atmosphere.

BRIEF DESCRIPTION OF THE DRAWINGS

FIG. 1 is a top plan view of the temperature controller of the invention;

FIG. 2 is a side elevational view in partial section of the same temperature controller;

FIG. 3 is a bottom view of the same temperature controller; and

FIG. 4 is a side elevational view of the plug applied to the temperature controller.

DETAILED DESCRIPTION OF THE PREFERRED EMBODIMENT

Referring to FIG. 1 through FIG. 4, the temperature controller of the invention comprises a housing 10, which is preferably made of a plastic material, an upper plate 10A, which may also be made of a plastic material, a rotatable dial 11 having a pointer 21 for setting a temperature level, a plug 20 having a base member 12, which is preferably of plastic, a central projecting guide-pin 15, and a plurality of projecting terminal-pins 14 surrounding the guide-pin 15, a cold junction compensation element 18, and a known control circuit unit 25 (shown by dotted lines in FIG. 2 and described in detail in the above referred to catalog) mounted in the interior of housing 10.

The guide-pin 15 with a key projection 15A cooperates with a pilot hole and keyway of a well-known socket with eight terminal-pins (not shown) to ensure orientation of the terminal-pins 14 with respect to the female-contacts of the socket. This plug construction permits a selective removal of the temperature controlled. The cold junctions of the thermocouple are generally positioned at terminals of the socket, the extension leads of the thermocouple being connected thereto. The hot junctions are generally connected to the extremity of the leads. The dial 11 is rotatably attached to upper plate 10A which, in turn, attached to the circuit unit. The plate 10A is marked with temperature graduations. Mounted on the plug 20 is the circuit unit. The assembly consisting of plug 20, circuit unit, upper plate 10A, and dial 11 is inserted into the interior of the housing 10 through its upper opening and is secured in fixed relative position by screws 13. A cold junction compensation element 18, mounted on the lower surface of a connecting board 19, is positioned in the internal space 16 of guide-pin 15 having an opening 17 at its bottom end.

The connecting board 19 interconnecting the terminal-pins 14, circuit unit, and cold junction compensation element 18 is fixed to the plug 20 and precludes passage of air from the cavity 16 into the interior of the housing 10, whereby the element 18 is protected from the heat from the circuit elements of the circuit unit such as a power transformer, electromagnetic relay, and variable resistor. The connecting board 19 also functions to prevent the circuit unit from foreign matter passing through space 16 into the interior of the housing 10. A protecting member such as a grating 17A, integrally formed with guide-pin 15, is provided across opening 17.

When the plug 20 is coupled to the socket (not shown), the bottom end of the guide-pin 15 is positioned below the lower surface of the socket or at approximately the same level as the lower surface, so that the cold junction compensation element 18 accurately detects the temperature of the exterior atmosphere.

Since the cold junction or junctions exist near the socket, the cold junction compensation for the temperature fluctuation in the ambient air is performed with accuracy.

What is claimed is:

1. In selectively removable temperature controller utilizing a thermocouple which comprises a housing, a control circuit unit mounted in the interior of said housing, a cold junction compensation element, a mounting plug closing an end portion of said housing and having a hollow projecting guide-pin and a plurality of projecting terminal-pins surrounding said guide-pin and means in said housing for interconnecting said control circuit unit, cold junction compensation element and terminal-pins, the improvement wherein said hollow guide-pin has an opening communicating with the exterior of said guide-pin and said cold junction compensation element is positioned in said hollow guide-pin.

2. A temperature controller as claimed in claim 1, wherein a protective member is provided across said opening adjacent the extremity of the projection of said hollow guide-pin.

3. A temperature controller as claimed in claim 1, wherein said hollow guide-pin has said opening at its bottom end.

4. A temperature controller as claimed in claim 1, wherein said cold junction compensation element is mounted on one surface of a connecting board fixedly secured to said plug for connecting said terminal-pins to said circuit unit and precluding the entry of foreign matter from said opening into the interior of said housing and the transmission of heat from said interior to said cold junction compensation element.

5. A temperature controller as claimed in claim 1, wherein said plug is provided with eight terminal-pins.

* * * * *